United States Patent Office 3,650,948
Patented Mar. 21, 1972

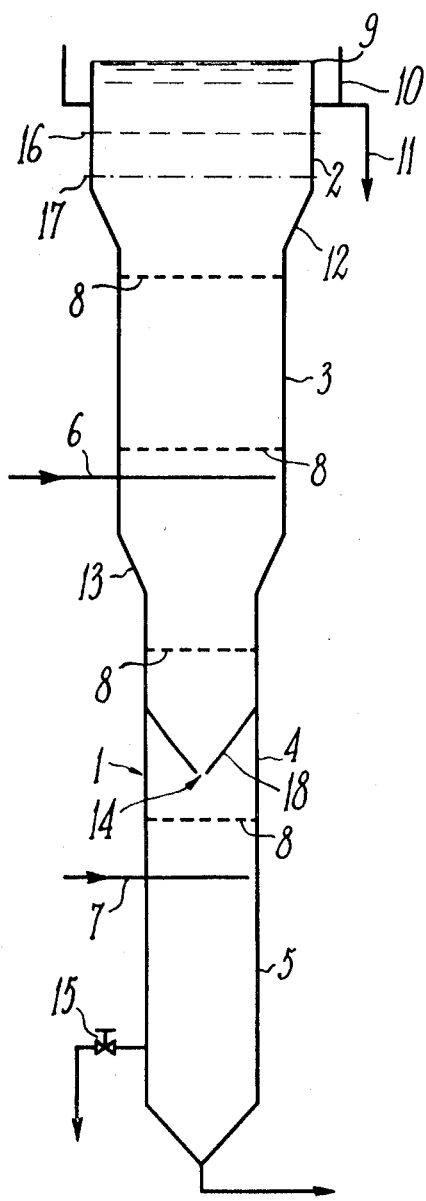
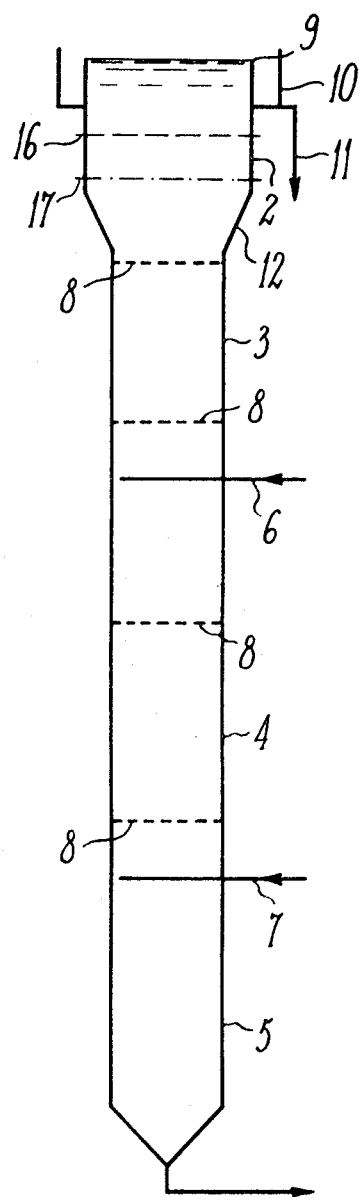

3,650,948
METHOD AND APPARATUS FOR THE CONTINUOUS REGENERATION OF ION EXCHANGE RESINS
Jean Clamart Burriat and Philippe du Fort, Louveciennes, France, assignors to Degremont, Societe Generale d'Epuration et d'Assainissement, Rueil, France
Filed Nov. 3, 1969, Ser. No. 873,369
Claims priority, application France, Nov. 20, 1968, 174,498
Int. Cl. B01d 15/06; B01j 1/06
U.S. Cl. 210—33
6 Claims

ABSTRACT OF THE DISCLOSURE

This invention provides a method of regenerating ion exchange resins in a fluid bed, which consists in loosening, actually regenerating and thereafter rinsing the regenerated ion exchange resins as a continuous process in a same and single enclosure, in superposed successive zones thereof, by possibly varying the upward speed of the liquids circulating in each one of said zones in counter-current relationship to the resin flow, as a function of the specific one of the aforesaid operations which is being performed in each one of the aforesaid zones.

The invention also comprises an apparatus for carrying out this method, which comprises a column in which the saturated resins circulate by gravity from top to bottom with the regenerating, washing and rinsing liquids circulating in counter-current relationship to the resins.

---

The present invention relates to methods and means for the continuous regeneration of ion exchange resins in a fluid bed.

It is known that the operation of ion exchangers requires, for the regeneration of ion exchange resins, the use of an acid chemical reagent for cation exchangers and of an alkaline chemical reagent for anion exchangers. The consumption of the chemicals thus implemented constitutes the major fraction of the cost for servicing an ion exchanger. Therefore, users have become inclined to look for cheaper chemicals for carrying out the regeneration steps, for example sulfuric acid in the case of cation exchangers and milk of lime for anion exchangers. However, the use of some of these cheaper products is either difficult or prevented by their specific properties; thus, in fact, it is impossible to use sulfuric acid for regenerating calcium-containing resins without running the risk of causing a calcium sulfate precipitation and therefore a serious disturbance in the operation of the apparatus, either because the precipitate will deposit on or in the exchanger granules, or because it will clog up the liquid return devices and pipings. Now this inconvenience cannot be avoided unless the acid is diluted considerably, thus reducing inasmuch the efficiency of the regenerating action of the acid, causing a high water consumption and an increase in size of various parts of the equipment.

The problem is still more complicated with lime, since the limewater concentration (calcium hydroxide solution) is already extremely low, and higher concentrations could not be obtained unless milk of lime is used, which is practically unfeasible with hitherto known commercial equipments.

On the other hand, it is known that the regeneration of ion exchange resins comprises three separate and necessary operations, namely:

(a) Loosening the resin layers, that is, breaking the preferential paths likely to develop in these layers and removing any impurities deposited on the surface or on the grains of resin;

(b) Regenerating the resin, i.e. percolating the reagents into the resin mass, and (c) Rinsing as required for eliminating the excess of reagent as well as the reaction products before the cycle of operation of the column containing the ion exchange resin, such as a demineralization cycle or the like, is resumed.

In apparatus operating batchwise or discontinuously, the abovementioned operations take place by simply percolating the regeneration and rinsing liquids through the resin layer; in contrast thereto, in continuous regeneration processes of known type the above mentioned operations are conducted by resorting to a counter-current exchange, the resin and liquid flowing in opposite directions in the same apparatus. However, in known apparatus of this type the resin layer is compact and the materials in suspension in the reagent or formed in the eluate cannot pass therethrough.

In the whole, known types of apparatus designed for exchanging ions in a compact bed or in a fluid bed consist of three separate chambers operatively interconnected and comprising in addition to the ion exchange column a regeneration column and a rinsing column; now this arrangement is attended by many inconveniences, notably the high cost of the necessary materials and also the excessive over-all dimensions, in addition to the substantial drawbacks mentioned hereinabove and resulting from the impossibility of utilizing chemical reagents suitable for regeneration purposes, if these chemicals are in suspension or produce a precipitate.

It is therefore the essential object of the present invention to provide a method of and an apparatus for the continuously regenerating and rinsing of ion exchange resins in a fluid bed, which are more capable of meeting practical requirements than hitherto known methods and apparatus serving the same purpose, notably in that the method and apparatus of the present invention permit the use of any suitable chemical reagent for regeneration purposes, even if a product in suspension or a product developing a precipitate is concerned, and that the apparatus for regenerating and rinsing the ion exchange resins in a fluid bed, which constitute the subject-matter of this invention, are further characterized by a simpler and safer mode of operation than apparatus of known type designed for the same purpose, the apparatus according to this invention having furthermore smaller overall dimensions and a lower cost than prior art apparatus.

It is the essential object of the present invention to provide a method of regenerating ion exchange resins in a fluid bed, which consists in loosening, actually regenerating and rinsing regenerated ion-exchange resins as a continuous process in a same and single enclosure, in superposed successive zones thereof, by possibly varying the upward speed of the liquids circulating in each one of said zones in counter-current relationship to the resin, as a function of the specific one of the afore-said operations which is being performed in each one of the aforesaid zones.

The method according to this invention is based on the discovery, made by the applicants during research works, that the two operations to be performed in ion-exchange resin regenerating equipment, namely:

(a) on the one hand, regenerating the saturated resin, that is, exchanging ions between the exhausted resin and the regenerating solution, which is an essentially chemical operation, (b) on the other hand, washing the resin in order to free same of any excess of reagent and products of the regenerating reaction, by exerting, a mainly physical action, are governed by the same laws, although these two operations differ completely from each other; thus, notably, they depend on the one hand on the relative velocities of the two fluids circulating in counter-current relationship through the apparatus, and on the other hand on the resin concentration of the medium, i.e. the rate of expansion of the resin. Moreover, the distribution of the two fluids, which controls the efficiency of each operation, is determined in turn by the aforesaid two factors (relative velocities of the two fluids and rate of expansion of the resin), which are themselves dependent on the speed of the ascending flow of liquids in the apparatus. However, the optimum conditions required for obtaining the maximum efficiency in each operation are not necessarily the same for each one of these operations, so that the regeneration operation and the rinsing operation may require different rates of flow of the liquids.

According to an advantageous provision of the method according to the present invention, the resin fed to the upper portion of the enclosure descends by gravity in said enclosure and flows firstly through a regeneration zone comprising at its lower portion an inlet for the regeneration reagent circulating in counter-current to the resin, then through a washing zone comprising at its lower portion a wash-water inlet, so that the wash-water circulates in counter-current relationship to the resin, the latter subsequenly decanting in a decantation zone located at the lower portion or bottom of the enclosure where it flows out from the apparatus by gravity and is subsequently recycled.

According to a second advantageous provision of the method according to this invention, the upward flow of the regeneration liquid in the regeneration zone takes place at a speed low enough to ensure the lowest possible rate of resin expansion, so that consequently, the resin concentration can be as high as possible, this resin concentration being in any case high enough to permit the discharge of the materials precipitated onto the resin grains during the regeneration reaction, or present in the reagent, the resin circulation speed and the height of the regeneration zone being necessarily such that the regeneration of the ion exchange grain is completed when each exchanger grain emerges from the regeneration zone.

According to a third advantageous provision of the method according to the present invention, and notably when the regeneration reagent is a suspension or in case this reagent produces a precipitate, the speed of the ascending flow of washing liquid must be higher in the washing space of the ion exchanger than the speed of the regeneration liquid in the regeneration zone, the height of said washing space being sufficient to create an interface between the eluate and the washing liquid, so that the ion exchange resin emerging from the washing zone is completely free of the eluate.

According to a fourth advantageous provision of the method according to this invention, the washing liquid rises within the enclosure until it contacts the regenerating liquid so as to dilute same, thus affording substantial savings in the consumption of water necessary on the one hand for diluting the regenerating reagent and on the other hand for performing the washing operation.

This invention is also concerned with an apparatus for carrying out the method of regenerating ion exchange resins in a fluid bed ,of which the essential features have been broadly set forth hereinabove.

The apparatus according to this invention is characterized in that it consists of a single column in which the resin circulates by gravity from top to bottom and the liquids circulate in the reverse direction, that is, in counter-current relationship to the resin, said column comprising from top to bottom, a resin input zone, a regeneration zone proper in which ions are exchanged between the exhausted resin and the regenerating liquid injected into the bottom of said zone with the assistance of a suitable device, this regenerating liquid circulating in counter-current relationship to the resin, a washing zone in which the products of the regeneration reaction and the products of the excess regeneration reagents are removed from the resin with the assistance of wash-water injected by suitable means into the lower portion of this zone, this wash-water circulating in counter-current relationship to the resin, and a storage zone in which the regenerated and washed resin is available for another cycle of operation.

According to an advantageous form of embodiment of the apparatus according to this invention for regenerating ion exchange resins in a fluid bed, the cross-sectional area of the regeneration zone is greater than the cross-sectional area of the resin washing zone, and smaller than that of the resin input zone.

According to a second advantageous form of embodiment of the apparatus of the present invention, the regeneration zone and the washing zone of smaller cross-sectional area are interconnected by a frustoconical section having a vertex angle calculated to cause a gradual decrease in the speed of the ascending wash-water current, thus ensuring a satisfactory distribution of the liquid streamlets while facilitating the resin flow during the movements of the fluid bed.

According to a third advantageous form of embodiment of the apparatus of the present invention, the washing zone comprises a device permitting of completing the resin washing operation by means of a stirring action obtained by increasing the wash-water speed, this device consisting of a frustoconical section having its small end disposed at the bottom, the size of its outlet orifice being calculated as a function of the wash-water output in order to obtain the desired higher speed, the upper or large end of this frustoconical section having the same diameter as said washing zone.

According to a fourth advantageous form of embodiment of the apparatus of this invention, the zone fed with saturated resins and the resin regeneration zone having a smaller cross-sectional area than said resin input zone are interconnected by a frustoconical sleeve of properly selected taper.

In addition to the above-mentioned provisions and arrangements, this invention comprises and affords other arrangements as will clearly appear from the following description.

This invention is directed more particularly to methods of and apparatus for the continuous regeneration of ion exchange resins in a fluid bed, according to the above-described provisions, to the elements necessary for carrying out these methods and constructing these apparatus, and also to methods and assemblies incorporating or including the methods and apparatus for regenerating ion exchange resins in a fluid bed according to the provisions of the present invention.

In order to afford a clearer understanding of this invention and of the manner in which the same may be carried out in practice, reference will now be made to the accompanying drawing illustrating diagrammatically by way of example two typical forms of embodiment of the invention. In the drawing:

FIG. 1 is a diagrammatic vertical axial section showing a first exemplary form of embodiment of an apparatus for the continuous regeneration of ion exchange resins in a fluid bed, according to the present invention, and FIG. 2 is a similar view showing a modified form of embodiment of a regeneration apparatus according to this invention.

Stress is laid on the fact that the drawing and the description referring thereto should not be construed as limiting the scope of the invention since the forms of embodiment given herein are merely illustrative of the subject-matter of the invention and liable to various modifications without departing from the scope of the invention as set forth in the appended claims.

The apparatus for the continuous regeneration of ion exchange resins in a fluid bed as shown in FIG. 1 comprises a substantially cylindrical and vertical column 1. This column 1 comprises an uppermost zone 2 adapted to be fed with the saturated resins. The resins to be regenerated circulate by gravity, i.e. downwards, through this column 1. The same column 1 further comprises in succession, below the resin inlet zone 2, a regeneration zone 3, another zone 4 in which the regenerated resins are washed, which comprises a tapered stirring device, and a zone 5 in which the regenerated and washed resins are decanted and stored.

The regeneration zone 3 comprises at its base a device 6 for injecting the regenerating liquid which circulates in countercurrent relationship to the resin, and the washing zone 4 comprises at its base a wash-water injection device 7, the water circulating in counter-current to the resin; each zone 3, 4 is equipped, in addition, with devices 8 for distributing the resin and the liquids circulating in the column 1.

The uppermost zone 2 receiving the saturated resins is advantageously equipped with a device (not shown) for controlling the resin level, which may consist of supersonic detectors, photoelectric cells, gamma-ray apparatus, etc., or the like.

The top of this column 1 further comprises, at the level of zone 2, an overflow 9 and a peripheral annular trough 10 connected to a drain pipe 11 leading to the sewer for removing the eluate of the regeneration process.

Due to the high instantaneous inputs of saturated resins fed to the aforesaid zone 2 the latter has a greater diameter than the regeneration zone 3, and these zones are interconnected by a frustoconical sleeve or wall 12 having a properly selected vertex angle.

The purpose of the washing operation taking place in zone 4 is to free the regenerated resin from the regeneration reaction products and from the excess regeneration reagents, by separation; this separation is a particularly delicate operation when eluates containing precipitated substances are concerned, and requires a considerably greater expansion of the resin bed than that required when said eluates consist only of soluble salts. In fact, in a medium containing a moderate proportion of resin grains these decant more rapidly than the precipitated substances, but in the column the precipitated substances are entrained by the resin during the movements thereof, in direct proportion to the degree of compactness of the resin bed; as a result, due to a greater fluidization a more pronounced separation of the resin grains, the precipitated granules can find their way more easily between the resin grains, thus improving their separation. This strong expansion is obtained by imparting to the wash-water a relatively high upward speed, but since this high speed is inconsistent with a satisfactory regeneration efficiency, the regeneration zone is given a greater cross-sectional area than that of the washing zone, and calculated to prevent an overstepping of the permissible maximum speed in the regeneration zone.

The regeneration zone 3 and the washing zone 4 of smaller diameter are interconnected by a frustoconical section 13 having a vertex angle calculated to cause a gradual reduction in the upward speed of the wash-water, thus ensuring a satisfactory distribution of the liquid streamlets and facilitating the resin flow during the bed movements.

In the washing zone 4 where the regeneration reaction products are separated from the excess regeneration reagents carried by the resin grains, another zone is provided wherein the resin washing operation is completed; in fact, some precipitate is deposited on the resin grains; although this precipitate has a moderate adhesive power, a mechanical action definitely more pronounced than that obtained in the separation and washing zone as a whole is required for separating this precipitate. To this end, there is provided in the separation and washing zone 4 a funnel-like frustoconical member or sleeve 18 having its small end at the bottom and an upper diameter equal to the diameter of the aforesaid separation and washing zone 4. By calculating the diameter of the outlet orifice 14 as a function of the wash-water throughput, a stirring action is obtained by increasing the speed of the wash-water, this stirring action separating the precipitate still adhering to the resin grains. The speed obtained at the vertex of this funnel 18 is such that the resin cannot decant through the diaphragm. To permit the resin flow the resin is transferred intermittently by adhering to the following procedure: a so-called discharge valve 15 controlled through any suitable means, notably, for example, electro-magnetic means, is disposed in the lower portion of column 1, that is, beneath the diaphragm, and opens, thus causing a high instantaneous output to the sewer; as this output is considerably greater than the wash-water input, it will not only cancel the upward speed in the diaphragm but also produce a strong downward stream of resin through the diaphragm. The operation of this valve 15 is advantageously controlled by level-responsive means (not shown) disposed in the zone 2 receiving the saturated resins, at the top of column 1. When the level is high (as shown at 16) the valve 15 opens, thus causing a resin transfer; the resin level will thus drop to the level of the low-level detector (the low level being shown by the dash and dot line 17) and then control the closing of valve 15, thus restoring instantaneously the wash-water output through the diaphragm and stopping immediately the resin flow. The resin fraction having thus been allowed to flow under the diaphragm is decanted while undergoing a last washing operation, and is deposited under the wash-water collector in the storage zone 5.

The apparatus for the continuous regeneration of ion exchange resins in fluid beds, which is illustrated in FIG. 1, is suitable more particularly in those cases where regeneration reagents such as sulfuric acid or lime are used, since these reagents give eluates of regeneration comprising precipitates; since the column 1 is open at the top and comprises an overflow 9 without any grid, sieve or the like, through which the mixture of water and used reagent flows to the sewer, the materials in suspension in the regeneration reagent or formed during the regeneration reaction are easily eliminated without causing any clogging.

The problem is simplified considerably in case the regeneration reagents used in the apparatus do not contain any substances in suspension or are not likely to produce precipitates, as observed notably with hydrochloric acid, soda, ammonia, etc., these reagents yielding eluates containing soluble salts.

An apparatus for the continuous regeneration of ion exchange resins in fluid bed according to the provisions of the present invention and suitable for regenerating ion exchange resins with the assistance of regeneration reagents free of precipitates or yielding eluates of regeneration free of precipitates is shown by way of example in FIG. 2 of the drawing. This apparatus constitutes a simplified version of the apparatus illustrated in FIG. 1 in that, in the limit case, the upward speed of the regeneration reagent and the upward speed of the wash-water may be identical, so that the diameter of the washing zone and the diameter of the regeneration zone may also be identical.

Moreover, it is ncessary to provide neither stirring means in zone 4 nor a discharge valve 15 in the apparatus illustrated diagrammatically in FIG. 3.

The method constituting the subject-matter of this invention, carried out by using the apparatus according to the provisions of this invention, will now be described more in detail in the following examples given by way of illustration only and without any limiting sense.

EXAMPLE 1

Regeneration of a cationic, calcium-saturated resin using sulfuric acid

This example illustrates the use of the method and apparatus of this invention in case the eluate contains precipitates; in this case, the apparatus illustrated in FIG. 1 will be preferred.

Column 1 is supplied with saturated resin via a metering hopper fed by gravity. This hopper has a volumetric capacity of 11 litres and is discharged completely every three minutes, i.e. 20 times in one hour, which corresponds to a resin output of 220 litres per hour. The average resin transfer speed is 1.5 meters per hour.

The quantity of sulfuric acid injected by the device 6 is 0.8 pure acid equivalent per litre of resin, corresponding to a hourly output of 176 equivalents representing 44 litres per hour of 20% acid.

The wash-water output injected by the device 7 is 900 litres per hour.

The eluate titrates in the average 0.2 equivalent/litre of calcium sulfate, of which 80% are in the form of a precipitate.

The diameter of the regeneration zone 3 is 430 mm. and the speed 6.5 meters per hour.

The diameter of the washing zone 4 is 240 mm. and the speed 20 meters per hour.

The diameter of the diaphragm in the frustoconical device 14 is 50 mm. and the speed 450 meters per hour.

The resin transfer in the separation zone overlying the cone 18 in the lower portion is effected by means of the discharge valve 15 as a function of the upper 16 and lower 17 levels of the resin bed, in the zone 2 fed with saturated resin.

The transfer of the regenerated and washed resins from the storage zone to the feed hopper of the next column (cycle column) is effected as a function of the resin demand of this next column. This demand takes place at a rate consistent with the cycle column, namely every 10 minutes. Under no circumstances can it exceed 220 litres per hour, since the transfer of saturated resins from the cycle column to the regeneration column 1 takes place via the metering hopper the operation of which is controlled by a timer and acts therefore as a means for regulating the resin output per hour.

The regeneration column the operation of which has just been described can easily be installed or incorporated in an industrial equipment capable of treating 44 cubic meters per hour of a water having a salt content corresponding to 4 calcium milliequivalents per litre.

The consumption of service water for washing and diluting the acid is 4.5 volumes per unitary volume of resin. The salt content of the water accompanying the resin is practically that of wash-water; the washing efficiency approximates 100%.

EXAMPLE 2

Regeneration of a calcium-saturated cationic resin using hydrochloric acid

This example illustrates the application of the method and apparatus of this invention to a condition wherein the eluate is free of precipitate. In this case it is advantageous to use the type of apparatus illustrated in FIG. 2.

The steps of supplying saturated resins to the column and transferring the regenerated and washed resin from the storage zone to the cycle column are the same as in the case of the two-diameter column illustrated in FIG. 1. The intermediate transfer from the upper portion to the lower portion of the washing zone is eliminated, since the frustoconical speed-incrementing device is no more necessary.

The diameter of the column is 240 mm.

The resin output is 75 litres per hour, corresponding to an average transfer speed of 1.67 meters per hour.

The quantity of hydrochloric acid injected by the device 6 is 0.8 equivalent per litre of resin, i.e. 60 equivalents/hour representing 33 litres per hour of 20% acid.

The wash-water output injected via the device 7 is 300 litres per hour, corresponding to a speed of 6.7 meters per hour in the washing zone.

In the regeneration zone 3 the output is 333 litres per hour, corresponding to a speed of 7.4 meters per hour.

The service water consumption for washing and diluting the acid is 4.44 volumes per unitary volume of resin.

From the foregoing it will be readily apparent that irrespective of the forms of embodiment, application and implementation resorted to, methods and apparatus for the continuous regeneration of ion exchange resins in fluid bed are obtained which are characterized by the substantial advantages set forth hereinabove over hitherto known methods and apparatus intended for the same purpose.

However, as evidenced by the above description, this invention is by no means limited by the forms of embodiment and practical applications exemplified in detail therein, since it will readily occur to anybody conversant with the art that many modifications and variations may be brought thereto without departing from the spirit and scope of the invention.

What we claim is:

1. A process for regenerating ion exchange resins in a fluid bed consisting in loosening, regenerating and washing the ion exchange resins regenerated, continuously in a single and the same enclosure having successive superposed zones comprising introducing said resin in the fluid bed at the upper portion of said enclosure, allowing said resin to descend by gravity, crossing first a regeneration zone, then a washing zone, then decanted in a decantation zone located at the lower portion of said enclosure from where it flows from said enclosure by gravity to be recycled, circulating the regeneration agent introduced through an inlet at the lower portion of the regeneration zone countercurrent to the resin in said zone, and circulating the washing water introduced at the lower portion of the washing zone countercurrent to the resin in said washing zone, at an ascending speed which is higher than the speed of the regenerating liquid in the regeneration zone.

2. A process as set forth in claim 1 wherein the ascending speed of the regenerating liquid in the regeneration zone is sufficiently slight in order that the expansion rate of the resin may be as small as possible and the concentration of the resin in such zone may be as high as possible, said ascending speed is sufficiently high in order to permit the evacuation of the precipitated materials upon the grains of resin during the regeneration reaction or present in the reagent while in said zone of regeneration, the speed of circulation of the resin and the height of the regeneration zone are calculated in order that the regeneration of the ion exchange grain may be terminated at the moment where each ion exchange grain leaves the regeneration zone.

3. A process according to claim 1 wherein the height of the washing zone is calculated in order to be sufficient to create between the eluate and the washing liquid a separation front so that at the exit from the washing zone the ion exchange resin may be totally freed from such eluate.

4. A process according to claim 1 wherein the washing liquid rises in the enclosure until it encounters the regenerating liquid to form a dilution.

5. An apparatus for the continuous regeneration of ion exchange resins in a fluid bed comprising a single column in which the resin circulates by gravity from top to bottom and the liquids in an opposite direction countercurrent to said resins, said column comprising from top to bottom a zone for the arrival of said resins, a regeneration zone in which the exchange of ions is carried out between the exhausted resin and the regenerating liquid, means for injecting at the base of said regeneration zone a regeneration reagent to circulate countercurrent to said resin, a washing zone, means in which said resin is cleared from the reaction products of the regeneration and the excess regeneration reagent with the aid of washing water injected at the base of said zone to circulate countercurrent to said resin, finally a storage zone in which the regenerated and washed resin is available for a new cycle of use, said regeneration zone being above said washing zone for the resin and below the inlet for the resins, a connection between said regeneration zone and said washing zone being made by the intermediary of a frusto-conic element whose inclination is such that it brings about a progressive diminution of the ascending speed of the washing water thus assuring a good separation of the liquid jets to facilitate the flow of the resin during the displacements of the bed.

6. An apparatus for the continuous regeneration of ion exchange resins in a fluid bed comprising a single column in which the resin circulates by gravity from top to bottom and the liquids in an opposite direction countercurrent to said resins, said column comprising from top to bottom a zone for the arrival of said resins, a regeneration zone in which the exchange of ions is carried out between the exhausted resin and the regenerating liquid, means for injecting at the base of said regeneration zone a regeneration reagent to circulate countercurrent to said resin, a washing zone, means in which said resin is cleared from the reaction products of the regeneration and the excess regeneration reagent with the aid of washing water injected at the base of said zone to circulate countercurrent to said resin, finally a storage zone in which the regenerated and washed resin is available for a new cycle of use, said regeneration zone being above said washing zone for the resin and below the inlet for the resins, said washing zone comprising an arrangement which allows the perfect washing of said resins by the aid of a mixing secured by increasing the speed of the washing water and which is formed by a truncated cone whose peak is directed towards the bottom and whose diameter of exit orifice is calculated as a function of the flow of washing water in such a way as to obtain an increase of speed while the upper diameter of the cone is equal to the diameter of the washing zone.

References Cited

UNITED STATES PATENTS

| | | | |
|---|---|---|---|
| 1,671,864 | 5/1928 | Higgins | 210—33 X |
| 2,528,099 | 10/1950 | Wilcox et al. | 210—33 |
| 2,783,189 | 2/1957 | Bergstrom et al. | 210—268 X |
| 2,904,518 | 9/1959 | Shea | 210—268 X |
| 3,458,440 | 7/1969 | Schmidt | 210—32 |

FOREIGN PATENTS

| | | | |
|---|---|---|---|
| 880,982 | 10/1961 | Great Britain | 210—33 |

SAMIH N. ZAHARNA, Primary Examiner

T. G. WYSE, Assistant Examiner

U.S. Cl. X.R.

210—189, 268